Feb. 5, 1946. S. L. GOOKIN 2,393,984
GROMMET AND WASHER ASSEMBLAGE
Filed Sept. 23, 1943
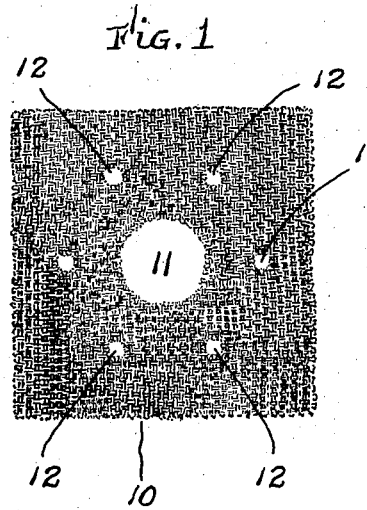
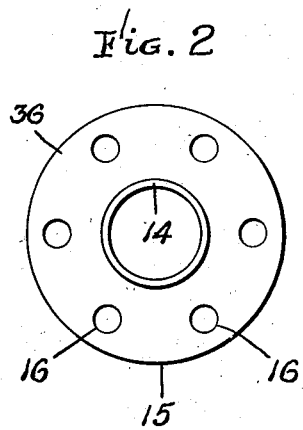
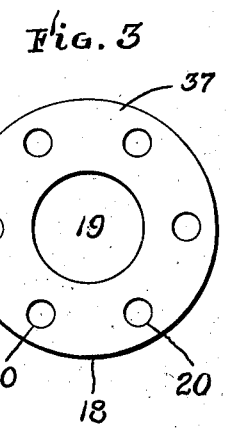
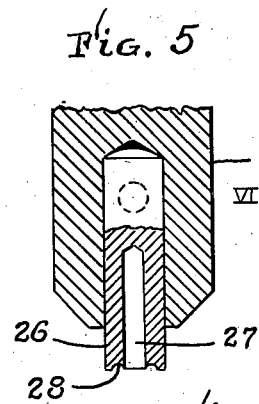
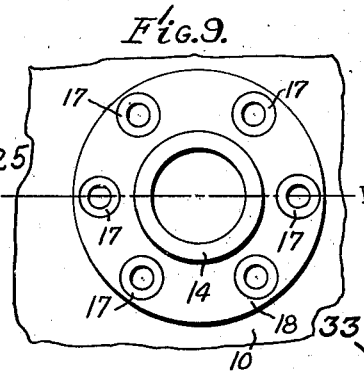
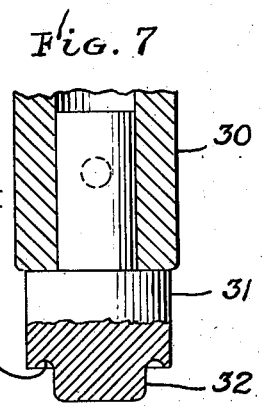
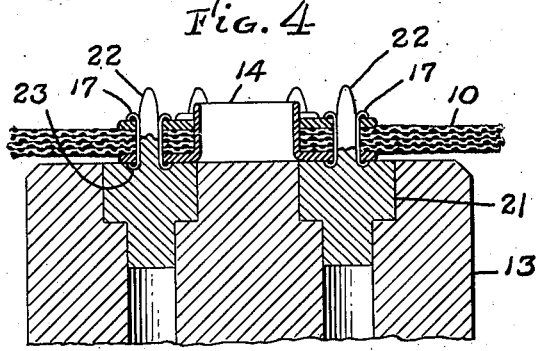
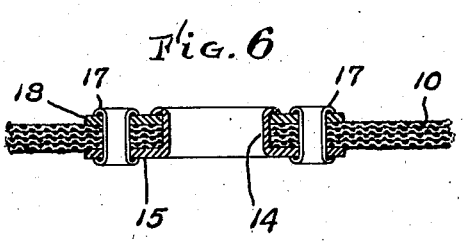
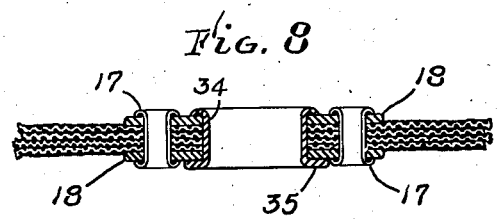
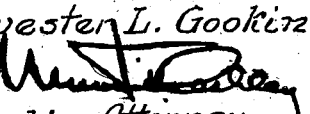
Inventor
Sylvester L. Gookin
by
his Attorney Patented Feb. 5, 1946

2,393,984

UNITED STATES PATENT OFFICE 2,393,984

GROMMET AND WASHER ASSEMBLAGE

Sylvester L. Gookin, Quincy, Mass., assignor to United Shoe Machinery Corporation, Flemington, N. J., a corporation of New Jersey Application September 23, 1943, Serial No. 503,565

3 Claims. (Cl. 24—141)

The purpose of the present invention is to provide an improved grommet and washer assemblage capable of withstanding exceedingly heavy stresses. For example, tarpaulins used to lash war supplies to the decks of cargo ships or to secure airplanes grounded in the open during wind storms require grommet and washer assemblages of this type to receive the guy ropes or tethers by which they are held. For these uses each grommet is required to withstand a pulling strain of at least 600 pounds without tearing the tarpaulin or suffering any weakening of its anchorage therein.

Grommets and washers heretofore used have been incapable of withstanding stresses so heavy, and their deficiency in this respect is due to the fact that much, if not all, of their clamping effect is localized in a small circle adjacent to the barrel of the grommet, with little if any clamping by the outer margin of the washer. In some prior types, grommets and washers have been provided with prongs arranged to penetrate the fabric to which they are applied, but such prongs merely weaken the fabric by forming incisions without maintaining the clamping pressure required for heavy stresses.

The present invention provides a grommet and washer assemblage in which an endless band of the fabric of a tarpaulin or other product may be clamped with heavy pressure derived from a series of relatively small eyelets located in the outer margins of a grommet and washer or two washers. Such clamping pressure may be supplemented by a component derived from the barrel of the grommet located inside the endless band above mentioned.

Referring to the drawing:

Fig. 1 represents a small portion of a canvas product in which one large hole and six small holes have been punched to receive a grommet and eyelets;

Fig. 2 represents the work-engaging side of a grommet in which the barrel and the clamping flange are integral;

Fig. 3 represents a work-engaging plate or washer;

Fig. 4 represents a partially completed assemblage in cross section lying on an assembling anvil, the endless band of pressure being maintained by clenched eyelets although the barrel of the grommet is not clenched;

Fig. 5 is a sectional view of a portion of a tool for clenching the eyelets;

Fig. 6 represents a cross-sectional view (line VI—VI of Fig. 9) of a completed assemblage having the same details as those shown in Fig. 4;

Fig. 7 is a sectional view of a portion of a tool for clenching the grommet;

Fig. 8 is a cross-sectional view of an assemblage that differs from the other in that the grommet and the lower washer or clamping plate are individual elements; and Fig. 9 is a plan view of a completed assemblage.

Tarpaulins usually comprise a plurality of layers of canvas 10 at their margins or wherever grommets are to be installed. Four layers are represented in Figs. 4, 6 and 8. These are sewn through and through to provide for withstanding heavy stresses. Moreover, the canvas is impregnated with a waterproofing compound. A hole 11 is cut in all the layers to receive and fit the barrel of a grommet, and a series of small holes 12 may also be cut to receive eyelet barrels.

A grommet of the type shown in Figs. 2, 4 and 6 comprises a tubular barrel portion 14 and a flat rigid flange 15 constituting a clamping plate intended to engage an endless band of the bottom surface of the canvas. Small holes 16 are provided in the flange 15 near but inside its outer edge to receive eyelets 17. A flat rigid metal washer 18 (Fig. 3) constituting another clamping plate is provided with a large central hole 19 for the barrel 14 and with small holes 20 for the eyelets.

The anvil block 13 is provided with a plurality of hardened steel anvils 21 each having an upstanding pilot 22 and an annular clenching surface 23 surrounding the base of the latter where a narrow groove of curved section is formed. The surface 23 is designed to upset the entering end of an eyelet with what is commonly termed a "roll clench." The anvils 21 are located according to the pattern of the holes 16 and 20 in the grommet and washer.

After pressing down the canvas on the barrel of the grommet and on the pilots 22, the operator will place a washer 18 on these elements, after which he will place an unclenched eyelet 17 on each pilot and drive it through the washer, the canvas and the flange of the grommet. For this purpose he may use a hand stock 25 (Fig. 5) and a hammer. This hand stock is provided with a setting tool 26 having a central bore 27 and a grooved seat 28 for the head or flange of the eyelet. The bore 27 is large enough to receive a pilot 22. Having inserted all the eyelets, preferably without clenching them, he will make another round with the hand stock and the hammer, this time clenching the lower ends of the eyelets against the anvils, with the result shown in Fig. 4. This operation will cause a series of segments of the outer margins 36 and 37 of the plates to clamp an endless band of the canvas surrounding the entire group of eyelets and the barrel 14 even before the latter is clenched, the clenched eyelets alone being effective to maintain the clamping pressure all around the band.

After all the eyelets have been clenched, the operator may finish the assemblage by turning over and clenching the upper end of the grommet barrel 14. For this purpose he may use another hand stock 30 (Fig. 7) and a hammer. This hand stock is provided with a clenching tool 31 having a pilot 32 and an annular clenching surface 33 surrounding the base of the latter. This surface is provided by a groove of curved section designed to generate a roll clench, as shown in Fig. 6. Here, although the clenched portion of the grommet increases the clamping pressure of the plates against the clamped band of the canvas its primary function is to provide a smooth bell-mouthed throat through which a rope may be reeved without becoming unduly chafed.

A similar assemblage may be obtained with two clamping washers 18 and an individual grommet having a barrel portion 34 and a narrow flange 35 (Fig. 8). The implements above described may be used to install this assemblage, but the procedure may be changed in one respect, namely, the grommet need not be placed on the anvil block 13 until after all the eyelets have been clenched to develop the primary clamping pressure of the two washers. In this case the eyeleted assemblage may be lifted above the pilots 22, the unclenched grommet may be placed on the anvil block, the canvas and washers pressed down on the upstanding barrel of the grommet, and finally, the stock 30 and a hammer may be used to clench the grommet against the washers and thereby supplement their clamping pressure, particularly between their interior margins.

In either case, the interior margins of the two clamping plates, whether two washers or one washer and a wide grommet head, engage the canvas bounding the hole 11 and are finally connected and forced against the canvas with supplemental pressure by a large tubular grommet element that provides a smooth throat for a rope. Moreover, the pilots 22 not only insure register of the eyelet-receiving holes while the eyelets are being inserted but they also align the eyelets and guide the setting tool 26. Although the eyelets are represented in section in Figs. 4, 6 and 8, the conventional cross-hatch lines commonly used to indicate sections are omitted in the interest of clarity because the metal of the eyelets is thin.

Having described my invention, what I claim as new and desire to secure by Letters Patent of the United States is:

1. A grommet and washer assemblage comprising a work piece of sheet material, a pair of metallic clamping plates lying in confronting relation against opposite faces of the work piece, a series of small clenched eyelets extending through sheet-engaging portions of the plates inside but adjacent to their outer edges and maintaining clamping pressure of a series of segments of the outer margins of the plates against an endless band of the work piece, one of said plates having a large integral tubular grommet portion surrounded by said band and by the other one of said plates, and said grommet portion having a clenched end by which supplemental clamping pressure is applied to the plates within said band.

2. A grommet and washer assemblage comprising an element of sheet material having a hole, a pair of clamping plates engaging opposite faces of an endless band of the sheet material bounding said hole, a relatively large tubular grommet barrel extending through said hole and connecting the interior band-engaging portions of said plates, and a series of relatively small clenched eyelet barrels each extending through said band and connecting the band-engaging portions of said plates, said eyelet barrels being arranged to maintain clamping pressure of said plates all around said grommet barrel.

3. A grommet and washer assemblage comprising a work piece of sheet material having a hole, a pair of clamping plates lying against opposite faces of the sheet material and each having an endless band of contact with a band of sheet material bounding said hole, a series of small clenched eyelet barrels connecting said plates and extending through said band of material, and a large tubular grommet barrel extending through said hole and connecting the interior margins of said plates, said eyelet barrels and said grommet barrel all cooperating to maintain composite clamping pressure of the plates against said band of material.

SYLVESTER L. GOOKIN.